US012063509B2

(12) United States Patent
Marquardt et al.

(10) Patent No.: US 12,063,509 B2
(45) Date of Patent: Aug. 13, 2024

(54) HYPERLEDGER AUTHORIZATION INTO A RADIO ACCESS NETWORK (RAN)

(71) Applicant: T-Mobile Innovations LLC, Overland Park, KS (US)

(72) Inventors: Ronald R. Marquardt, Woodinville, WA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/314,133

(22) Filed: May 8, 2023

(65) Prior Publication Data
US 2023/0284025 A1   Sep. 7, 2023

Related U.S. Application Data

(62) Division of application No. 17/850,705, filed on Jun. 27, 2022, now Pat. No. 11,683,689, which is a
(Continued)

(51) Int. Cl.
*H04L 29/06* (2006.01)
*H04W 8/06* (2009.01)
(Continued)

(52) U.S. Cl.
CPC ........... *H04W 12/084* (2021.01); *H04W 8/06* (2013.01); *H04W 12/02* (2013.01); *H04W 12/06* (2013.01)

(58) Field of Classification Search
CPC .... H04W 12/084; H04W 8/906; H04W 12/06
See application file for complete search history.

(56) References Cited

U.S. PATENT DOCUMENTS 9,154,955 B1   6/2015   Bertz et al.
11,425,567 B2   8/2022   Marquardt et al.
(Continued)

FOREIGN PATENT DOCUMENTS

CN   111464490 A   7/2020
WO   2022031344 A1   2/2022

OTHER PUBLICATIONS

Notice of Allowance dated Apr. 29, 2022, U.S. Appl. No. 16/987,280, filed Aug. 6, 2020.
(Continued)

*Primary Examiner* — Jason K Gee

(57) ABSTRACT

A method of authenticating and authorizing a wireless communication device for access to a communication service. The method comprises receiving a service request from a wireless communication device by a access node, parsing the service request by the access node, based on parsing the service request, determining by the access node that the wireless communication device is seeking combined authentication and service authorization, sending the service request by the access node to a hyperledger gateway, receiving an authentication success response associated with the wireless communication device and a service authorization success response by the access node from the hyperledger gateway, and sending the service request by the access node to a communication service computer system, whereby the service request is both authenticated and authorized by the hyperledger gateway in a combined transaction and a requested communication service is provided to the wireless communication device.

20 Claims, 12 Drawing Sheets

Related U.S. Application Data division of application No. 16/987,280, filed on Aug. 6, 2020, now Pat. No. 11,425,567.

(51) Int. Cl.
*H04W 12/02* (2009.01)
*H04W 12/06* (2021.01)
*H04W 12/084* (2021.01)

(56) References Cited

U.S. PATENT DOCUMENTS

| | | | |
|---|---|---|---|
| 11,683,689 | B2 | 6/2023 | Marquardt et al. |
| 2013/0325700 | A1 | 12/2013 | Chakraborty et al. |
| 2019/0273739 | A1* | 9/2019 | Pemmaraju ......... H04L 63/0884 |
| 2019/0379664 | A1 | 12/2019 | Suthar et al. |
| 2020/0195495 | A1* | 6/2020 | Parker .................... H04L 41/40 |
| 2020/0221299 | A1* | 7/2020 | Suthar .................. H04W 60/00 |
| 2020/0374974 | A1 | 11/2020 | Sun et al. |
| 2021/0160314 | A1 | 5/2021 | Parvataneni |
| 2021/0243612 | A1* | 8/2021 | Kempf .................. H04W 28/18 |
| 2022/0046419 | A1 | 2/2022 | Marquardt et al. |
| 2022/0330023 | A1 | 10/2022 | Marquardt et al. |

OTHER PUBLICATIONS

Foreign Communication From a Related Counterpart Application, International Search Report and Written Opinion dated Sep. 13, 2021, International Application No. PCT/US2021/034117 filed on May 25, 2021.

Marquardt, Ronald R., et al., "Hyperledger Authorization into a Radio Access Network (RAN)," filed May 25, 2021, International Application No. PCT/US2021/034117.

Notice of Allowance dated Feb. 17, 2023, U.S. Appl. No. 17/850,705, filed Jun. 27, 2022.

* cited by examiner

HYPERLEDGER AUTHORIZATION INTO A RADIO ACCESS NETWORK (RAN)

CROSS-REFERENCE TO RELATED APPLICATIONS

This application is a divisional of and claims priority under 35 U.S.C. § 120 to U.S. patent application Ser. No. 17/850,705, filed on Jun. 27, 2022, entitled "Hyperledger Authorization into a Radio Access Network (RAN)," by Ronald R. Marquardt, et al., which is a divisional of and claims priority under 35 U.S.C. § 120 to U.S. patent application Ser. No. 16/987,280, filed on Aug. 6, 2020, entitled "Hyperledger Authorization into a Radio Access Network (RAN)," by Ronald R. Marquardt, et al., now U.S. Pat. No. 11,425,567 issued Aug. 23, 2022, all of which are incorporated herein by reference in their entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A wireless communication device may be provided a wireless communication link by a access node and therethrough be provided a communication link to a communication network. The access node may challenge the wireless communication device to provide various credentials to obtain communication services requested by the wireless communication device. A first step may involve authenticating the wireless communication device. Authentication may involve the wireless communication device providing an identity and one or more secret keys, such as network access credentials. The access node may forward the authentication credentials to another node in the core network for authentication (e.g., to determine if the wireless communication device is provided with a wireless communication service subscription and to determine if the subscription account is in good standing). Once authenticated, the wireless communication device may be given access to the requested communication service. Alternatively, depending on what communication service is requested (e.g., if an optional or premium communication service is requested), the access node may further forward the authentication credentials to a different node to determine if the wireless communication device is authorized to use the requested communication service. If the wireless communication device is authorized to use the requested communication service, the access node may provide a communication session between the requested communication service and the wireless communication device.

SUMMARY

In an embodiment, a method of authenticating and authorizing a wireless communication device for access to a communication service is disclosed. The method comprises receiving a first service request from a first wireless communication device by a access node, parsing the first service request by the access node, and, based on parsing the first service request, determining by the access node that the first wireless communication device is seeking conventional authentication. The method comprises sending the first service request by the access node to one of a home location register (HLR) or a home subscriber server (HSS) to complete authentication, receiving a first authentication success response associated with the first wireless communication device by the access node, and, based on parsing the first service request, sending a service authorization request associated with the first wireless communication by the access node to a mobility management entity (MME). The method comprises receiving a first service authorization success response associated with the first wireless communication device by the access node from the MME and sending the first service request by the access node to a communication service computer system, whereby a requested communication service is provided to the first wireless communication device. The method comprises receiving a second service request from a second wireless communication device by the access node, parsing the second service request by the access node, and based on parsing the second service request, determining by the access node that the second wireless communication device is seeking combined authentication and service authorization. The method comprises sending the second service request by the access node to a hyperledger gateway, receiving a second authentication success response associated with the second wireless communication device and a second service authorization success response by the access node from the hyperledger gateway, and sending the second service request by the access node to a communication service computer system, whereby the second service request is both authenticated and authorized by the hyperledger gateway in a combined transaction and a requested communication service is provided to the second wireless communication device.

In another embodiment, another method of authenticating and authorizing a wireless communication device for access to a communication service is disclosed. The method comprises receiving a first service request from a wireless communication device by an access node, parsing the first service request by the access node, and, based on parsing the first service request, determining by the access node that the wireless communication device is seeking combined authentication and service authorization. The method comprises sending the first service request by the access node to a hyperledger gateway, receiving an authentication failure response by the access node from the hyperledger gateway, in response to receiving the authentication failure response, sending the first service request by the access node to one of a home location register (HLR) or a home subscriber server (HSS), and receiving a first authentication success response by the access node from the one of the HLR or the HSS. The method comprises, in response to receiving the first authentication success response, sending the first service request by the access node to a mobility management entity (MME), receiving a service authorization success response by the access node from the MME, and notifying the hyperledger gateway by the access node that the wireless communication device successfully completed authentication and service authorization, whereby the hyperledger gateway establishes a record of the successful authentication and service authorization associated with the wireless communication device in a shared data store. The method comprises receiving a second service request from the wireless communication device by the access node, parsing the second service request by the access node, and based on parsing the second service request, determining by the access node that the wireless communication device is seeking combined authentication and service authorization. The method comprises sending the second service request by the access node to the hyperledger gateway, receiving a second authentication success response and a first authorization success response by the access node from the hyperledger gateway, and sending the second service request to a communication service computer system by the access node, whereby the second service request is both authenticated and authorized by the hyperledger gateway in a combined transaction and a requested communication service is provided to the wireless communication device.

In yet another embodiment, a hyperledger gateway for use in completing combined authentication and service authorization operations is disclosed. The hyperledger gateway comprises a processor, a non-transitory memory, a shared data store, and an application stored in the non-transitory memory. The shared data store comprises a hyperledger, wherein the hyperledger comprises a plurality of record blocks, each record block comprising a hash of a previous block of the hyperledger, information content, and a hash over the hash of the previous block and over the information content, wherein the shared data store is read-only accessible to computer systems outside of the hyperledger gateway, and wherein the shared data store is read-write accessible to the hyperledger gateway. The application, when executed by the processor, based on an authentication and service authorization of a wireless communication device, builds a first hyperledger record associated with the wireless communication device, wherein the information content of the first hyperledger record indicates the authenticated status and the service authorization status of the wireless communication device, stores the first hyperledger record in the shared data store, receives a combined authentication and service authorization request associated with the wireless communication device from a access node, and looks up the first hyperledger record based on an identity of the wireless communication device included in the combined authentication and service authorization request. The application, based on the first hyperledger record, confirms that the wireless communication device is authorized to receive a requested communication service and sends an authentication success response and a service authorization success response to the access node, whereby the wireless communication device is both authenticated and authorized by the hyperledger gateway in a combined transaction and a requested communication service is provided to the wireless communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
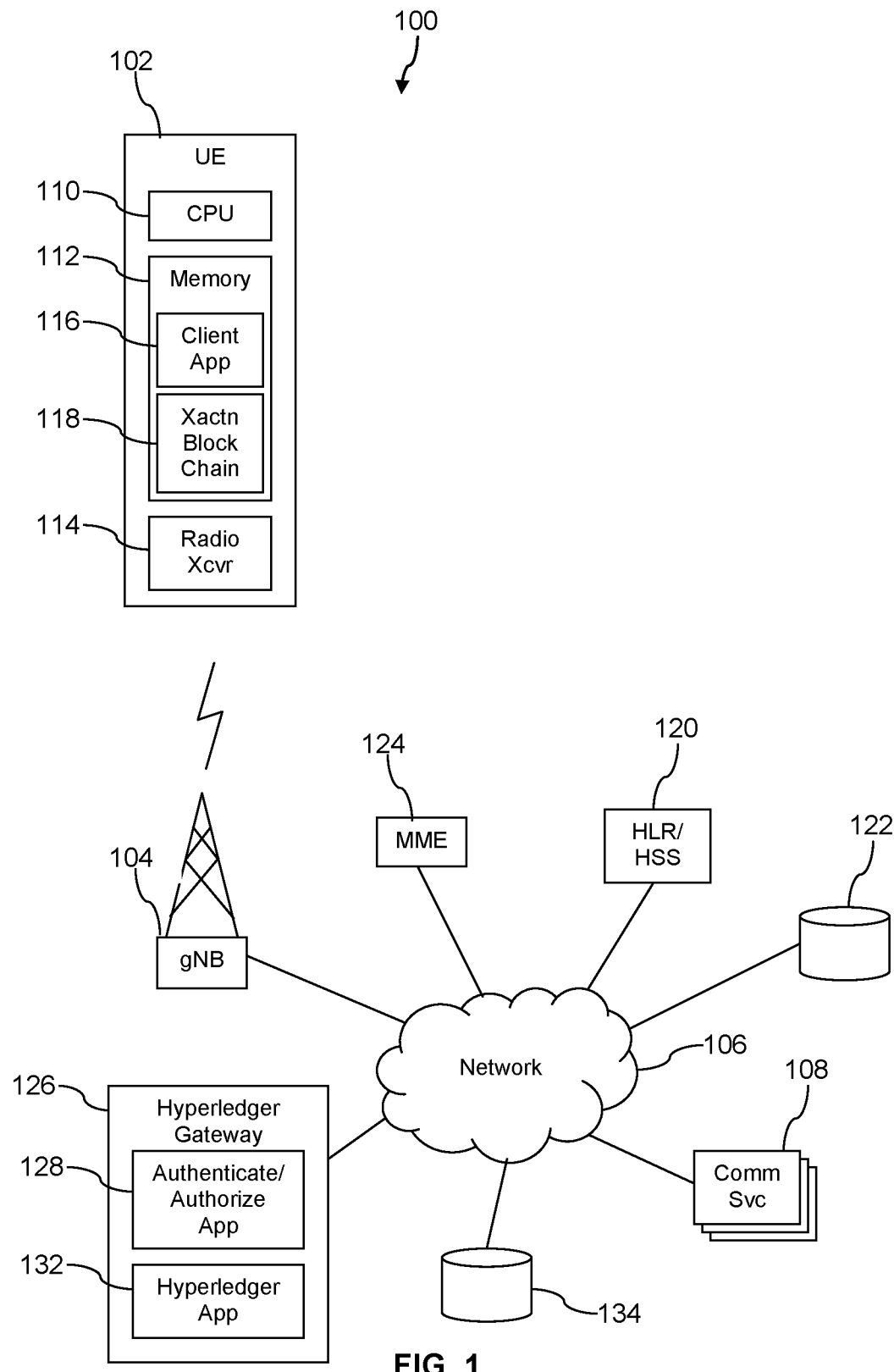
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a system that identifies wireless communication devices as (1) legacy devices or (2) compatible devices (i.e., compatible with the new authentication/authorization taught herein), provides conventional authentication and service authorization treatment for legacy devices, and provides new authentication and service authorization treatment for compatible devices. Specifically, a new system and method provide authentication and authorization for distinctive communication services that bypasses a conventional two-stop authentication and authorization process that involves (A) a dip to one of a home subscriber server (HSS) or a home location register (HLR) and (B) a dip to a mobility management entity (MME) and instead completes an integrated one-stop authentication and authorization through a hyperledger gateway. The integrated one-stop authentication and authorization process may be referred to as a combined authentication and service authorization process in some contexts. Legacy devices continue to be processed with conventional two-stop authentication at one of an HSS or HLR and authorization at the MME, thereby avoiding large scale upgrades and risks of service failures. A benefit of the new integrated one-stop authentication/authorization is that the high cost of maintaining HSS/HLR platforms can be phased-out over time. Alternatively, the high costs of building out additional HSS/HLR platforms to support additional new wireless communication devices as they come into service, for example as a very large number of Internet of things (IoT) wireless communication devices are deployed to wireless communication service, may be avoided or reduced.

The hyperledger gateway comprises a hyperledger stored in a shared data store. The hyperledger gateway has read and write access to the shared data store; other wireless communication service providers may have read only access to the shared data store, for example to support wireless communication service roaming functionality and/or to support third party billing. The shared data store, for example, may support a billing application executing in a cloud computing environment. The hyperledger stores microcontracts associated with different compatible wireless communication devices and stores microtransactions and microbilling events associated with those devices. The microcontracts "bake in" what the compatible wireless communication devices can do (e.g., the communication services they are authorized to receive) and their authentication parameters. This is by contrast with a conventional HSS/HLR process where the HSS/HLR can't tell what distinctive communication services a wireless communication device may have a right to access but instead must rely on the MME to determine those distinctive communication service rights. Said in other words, the conventional process involves (1) an authentication by the HSS/HLR and (2) an authorization by the MME.

An access node (e.g., a cell site) or a node in the core network will have a controller element that will detect a compatible wireless communication device seeking a combined authentication and service authorization and send this service request to the hyperledger gateway. The hyperledger gateway may then complete the requested authentication and service authorization based on a record associated with the wireless communication device stored in the shared data store. Otherwise this transaction goes to the HSS/HLR and then on to the MME. A result of the system and methods described herein provide a framework and/or platform that may support authentication, authorization, transaction recordation, and transaction billing in a unified manner.

It will be appreciated that modern communication networks are more or less continuously evolving. This may present various challenges involved in supporting interworking between newly emerging technology and previous technology. At the time of this filing, wireless communication companies are designing and beginning to deploy 5G wireless technology. 5G is hoped to provide virtually unlimited bandwidth on demand, for example providing access on demand to as much as 10 gigabits per second (gbps) downlink data throughput. Due to the increased bandwidth associated with 5G, it is expected that the new networks will serve, in addition to conventional cell phones, general internet service providers for laptops and desktop computers, competing with existing ISPs such as cable internet, and also will make possible new applications in internet of things (IoT) and machine to machine areas.

5G technology may be bifurcated into 5G radio technology and 5G core network technology. 5G radio technology is commonly referred to as New Radio (NR) and provides support for carrier aggregation (CA), multiple input/multiple output (MIMO) operation, and beam forming operations. 5G core network technology is based on a service based architecture paradigm. Rather than constructing the 5G core network as a series of special purpose communication nodes (e.g., an HSS node, a MME node, etc.), the 5G core network is provided as a set of services or network functions. These network functions can include, for example, an authentication server function (AUSF), an access and mobility management function (AMF), a session management function (SMF), a data storage function (DSF), a network exposure function (NEF), a service capability exposure function (SCEF), a network repository function (NRF), a policy control function (PCF), and other functions. The network functions may be referred to a virtual network functions (VNFs) in some contexts. The 5G core network can provide a network slice to a subscriber, for example an enterprise customer, that is composed of a plurality of 5G network functions that are configured to provide customized communication service for that subscriber, for example to provide communication service in accordance with communication policies defined by the customer.

In an embodiment, the wireless communication device seeking combined authentication and service authorization may use an encrypted identity whereby to thwart cyber crime, for example to thwart international mobile subscriber identity (IMSI) spoofing or IMSI fraud. In an embodiment, the wireless communication device may encrypt its identity in such a way that it may be changed periodically in a pattern known to the hyperledger gateway, to deter replay attacks.

Turning now to FIG. 1, a communication system 100 is described. In an embodiment, the system 100 comprises a wireless communication device (user equipment—UE) that receives a wireless communication link from an access node 104 (e.g., gNodeB (gNB)). The access node 104 may provide a wireless communication link to the UE 100 according to a 5G, a long term evolution (LTE), a code division multiple access (CDMA), or a global system for mobile communications (GSM) telecommunication protocol. The access node 104 may be referred to as a cell site or a cell tower in some contexts.

The UE 102 may be a cell phone, a mobile phone, a smart phone, a personal digital assistant (PDA), a wearable computer, a headset computer, a laptop computer, a tablet computer, a notebook computer, or an Internet of things (IoT) device. The access node 104 provides a communication link to the UE 102 to a network 106, and the network 106 may provide a communication link to one or more communication services 108. The network 106 comprises one or more public networks, one or more private networks, or a combination thereof. In an embodiment, the UE 102 comprises a processor 110, a memory 112, and a radio transceiver 114. The memory 112 may comprise a non-transitory memory portion that comprises or stores a client application 116 and a transaction block chain data structure 118.

The system 100 further comprises a home location register (HLR) and/or home subscriber server (HSS) 120, a provisioning data store 122, and a mobility management entity (MME) 124. The provisioning data store 122 stores information about wireless communication service subscriptions, for example authentication credentials, service authorization credentials, and other subscription account information. The system 100 further comprises a hyperledger gateway 126 that executes an authentication and authorization application 128 and a hyperledger application 132. The hyperledger application 132 writes to a shared data store 134 where it maintains a hyperledger data structure and provides an application programming interface (API) that restricts access of other parties to read only access.

The hyperledger data structure maintained in the shared data store 134 comprises a plurality of block chains, where each block chain is associated with a different UE 102. Alternatively, the shared data store 134 comprises a single block chain that includes blocks associated with a plurality of different UEs 102. Each block in a block chain comprises a hash of the previous block of the block chain, an information content portion, and a hash over the hash of the previous block and over the information content portion. The information content of a block comprises information about the communication transactions of one of the UEs 102 and the service authorizations of the one of the UEs 102. The service authorizations identify one or more communication services 108 that the UE 102 is authorized to access (e.g., the UE 102 is associated with a wireless communication service subscription that is granted the right to access the one or more communication services). In an embodiment, the communication services 108 comprise one or more of a streaming video communication service, a premium content communication service, or a gaming communication service. The communication services 108 may each be provided by or mediated by a computer system. Computer systems are described further hereinafter. In an embodiment, the information about service authorizations of the UE 102 may be defined in microcontracts and/or executable instructions.

Figure 2:
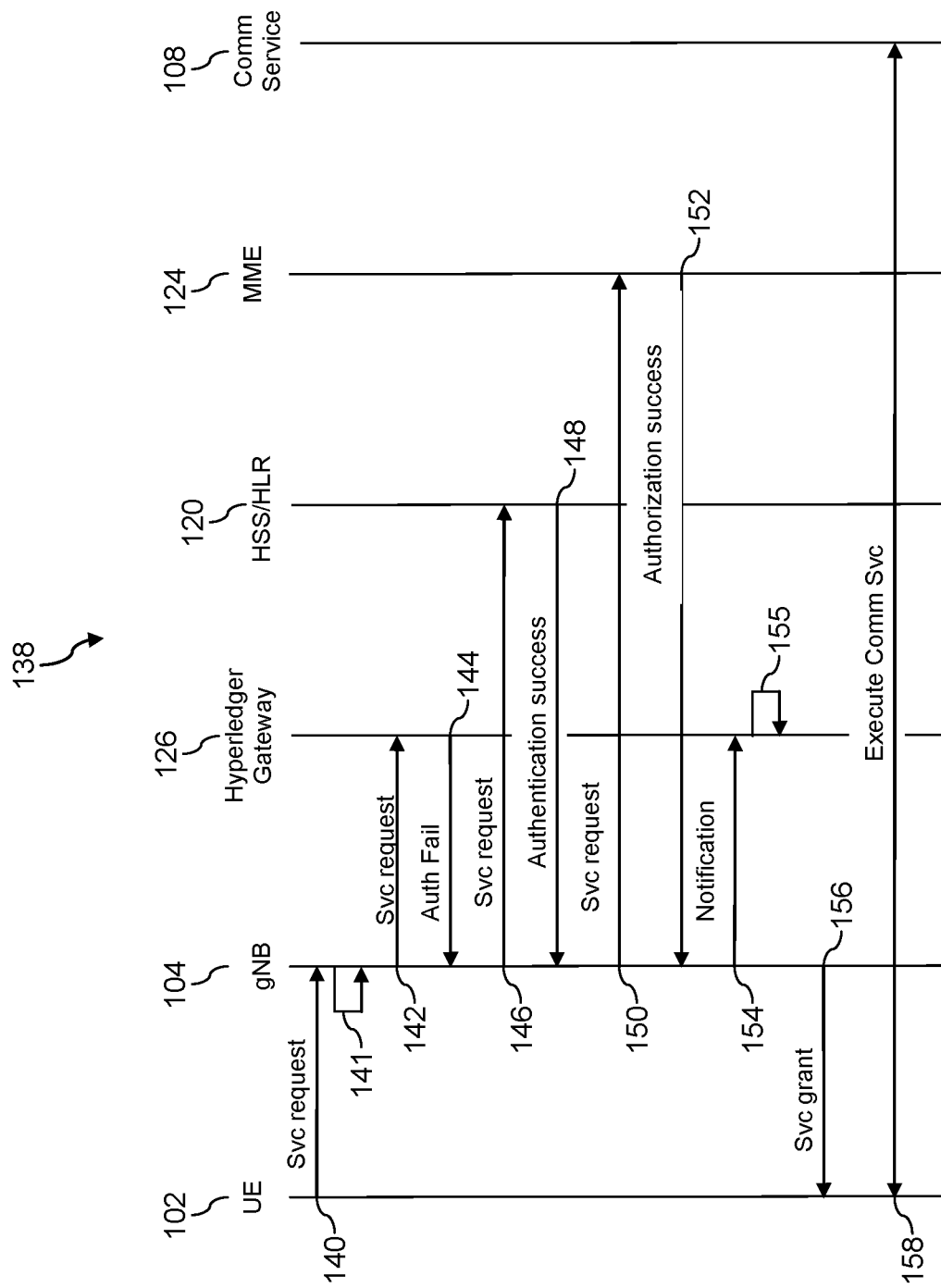
FIG. 2 is a message sequence diagram according to an embodiment of the disclosure.

Turning now to FIG. 2, a message sequence 138 is described. The message sequence 138 represents an exemplary sequence of messages that may pass in the system 100 to provide a communication service to the UE 102, for example one of the communication services 108. At label 140, the UE 102 sends a communication service request to the access node 104. At label 141, the access node parses the communication service request and determines that the communication service request at label 140 identifies a combined authentication and service authorization process (e.g., one-stop authentication/authorization). At label 142, the access node 104 sends the communication service request to the hyperledger gateway 126.

The hyper ledger gateway 126, in response to receiving the communication service request at label 142 attempts to look up information about the UE 102 in the shared data store 134. In the example illustrated by the message sequence 138, there is no information regarding the UE 102 in the shared data store 134, for example when the wireless communication service of the UE 102 has only recently been provisioned in the provisioning data store 122. The hyperledger gateway 126 does not find information about the UE 102 in the shared data store 134 and hence returns an authentication failure response at label 144 to the access node 104. In an embodiment, the authentication and authorization application 128 attempts to look up information about the UE 102 in the shared data store 122. In an embodiment, the authentication and authorization application 128 may attempt to look up the record associated with the UE 102 in the shared data store 122 through invoking the hyperledger application 132.

The access node 104, responsive to receiving the authentication failure response at label 144, sends a communication service request at label 146 to the HSS/HLR 120. The HSS/HLR 120 performs a conventional authentication for the UE 102 and returns an authentication success at label 148 to the access node 104. The HSS/HLR 120, for example, may look up information on a wireless communication service subscription associated with the UE 102 in the provisioning data store 122.

At label 150, the access node 104 sends a communication service request to the MME 124. The communication service request sent at label 150 may identify a particular communication service being requested by the UE 102, for example one of the communication services 108. At label 152, the MME 124 sends an authorization success to the access node 104. For example, the MME 124 looks up information on the wireless communication subscription associated with the UE 102 in the provisioning data store 122 and determines that the UE 102 is authorized to access the requested communication service 108. In an embodiment, at label 152, the MME 124 may identify all of the communication services 108 that the UE 102 is authorized to access and use and identify all of these communication services 108 in the authorization success sent at label 152.

At label 154, the access node 104 sends a notification of the authentication success and the authorization success to the hyperledger gateway 126. In an embodiment, the access node 104 informs the hyperledger gateway 126 of one or more of the communication services 108 that the UE 102 is authorized to access and use. The hyperledger gateway 126 at label 155 processes the notification of label 154 by creating a new block associated with the UE 102 that includes information about the authentication credentials of the UE 102 and the communication services 108 that the UE 102 is authorized to access and use. In an embodiment, the hyperledger gateway 126 may further send a copy of the newly created block to the client application 116 executing on the UE 102, whereby the client application 116 adds the newly created block to the transaction block chain 118 stored in the non-transitory portion of the memory 112 of the UE 102. In an embodiment, the newly created block information portion comprises a record of all the previous transactions completed by the UE 102 and information about all active communication service authorizations. This may be referred to as a "top block" data structure management strategy, wherein it is possible to learn the entire communication transaction history of the UE 102 by reading the last block associated with that UE 102—the "top block."

At label 156, the access node 104 sends a communication service grant to the UE 102. At label 158, the UE 102 is shown with a communication session established with one of the communication services 108. It is understood that in an embodiment, some of the steps described above may be different. For example, in an embodiment, upon successful authentication of the UE 102, the HSS/HLR 120 may request service authorization from the MME 124, rather than the access node 104 making this request as described above, and the HSS/HLR 120 may return the service authorization success to the access node 104. Additionally, rather than sending a service grant at label 156 to the UE 102, the access node 104 may simply establish the communication session at label 158 between the UE 102 and the communication service 108.

In an embodiment, the client application 116 may create a new block including all the previous information content of the top block of its transaction block chain 118 plus the information pertaining to the communication session at label 156, for example information identifying the communication service 108 and one or more of a time duration of the communication session, a data volume of the communication session, a time stamp of the start of the communication session, and/or a time stamp of the end of the communication session. The client application 116 may add this new block as the "top block" of its transaction block chain 118 and further may send this new block to the hyperledger gateway 126, for example to the hyperledger application 132, for adding to the hyperledger associated with the UE 102 that is stored in the shared data store 134.

Figure 3:
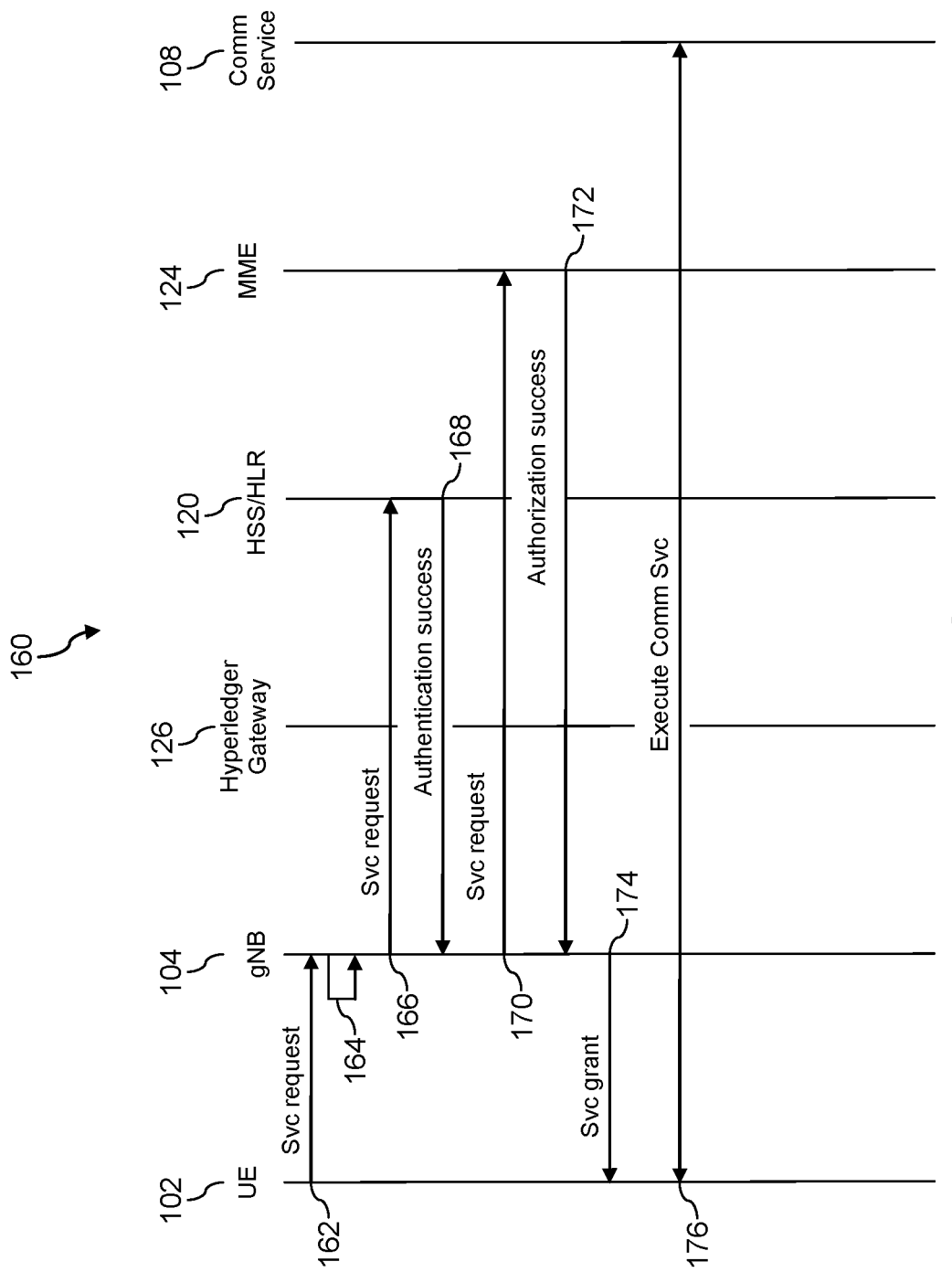
FIG. 3 is another message sequence diagram according to an embodiment of the disclosure.

Turning now to FIG. 3, a message sequence 160 is described. The message sequence 160 represents an exemplary sequence of messages that may pass in the system 100 to provide a communication service to the UE 102, for example one of the communication services 108. The message sequence 160 may be considered to represent a conventional authentication and service authorization process. At label 162, the UE 102 sends a communication service request 162 to the access node 104. Unlike in message sequence 138 described with reference to FIG. 2 above, the service request 162 does not indicate that a combined authentication and communication service authorization process is requested. At label 164, the access node 104 parses the communication service request and determines that the communication service request 162 identifies a conventional authentication (e.g., the UE 102 is seeking conventional authentication). In an embodiment, the communication service request at label 162 identifies no particular authentication process, and the access node 104 understands thereby that the UE 102 is seeking conventional authentication and not a combined authentication and service authorization process (because otherwise the communication service request at label 162 would explicitly indicate this combined process). Said in other words, the access node 104 may consider the communication service request by default to entail a conventional authentication, unless the communication service request explicitly designates a combined authentication and service authorization process.

At label 166, the access node 104 sends a communication service request to the HSS/HLR 120. At label 168, the HSS/HLR 120 sends an authentication success to the access node 104. The HSS/HLR 120, for example, may look up information on a wireless communication service subscription associated with the UE 102 in the provisioning data store 122. At label 170, the access node 104 sends a communication service request to the MME 124. The communication service request at label 170 may identify a particular communication service, for example one of the communication services 108. At label 172, the MME 124 sends an authorization success to the access node 104. For example, the MME 124 looks up information on the wireless communication subscription associated with the UE 102 in the provisioning data store 122 and determines that the UE 102 is authorized to access the requested communication service 108.

At label 174, the access node 104 sends a communication service grant to the UE 102. At label 176, the UE 102 is shown with a communication session established with one of the communication services 108. It is understood that in an embodiment, upon successful authentication of the UE 102, the HSS/HLR 120 may request communication service authorization from the MME 124, rather than the access node 104 making this request as described above, and the HSS/HLR 120 may return the communication service authorization success to the access node 104. Additionally, rather than sending a service grant at label 174 to the UE 102, the access node 104 may simply establish the communication session at label 176 between the UE 102 and the communication service 108.

Figure 4:
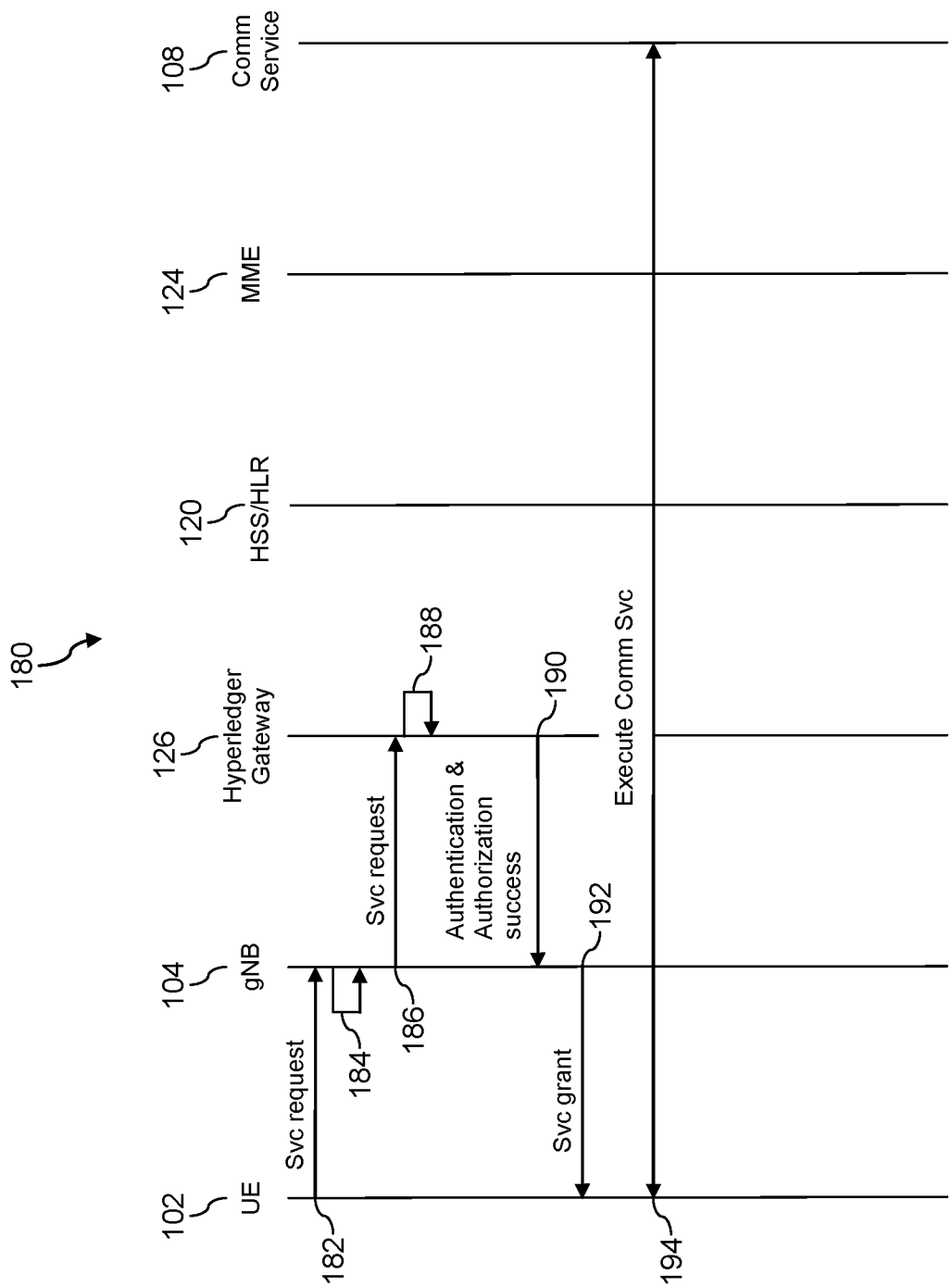
FIG. 4 is yet another message sequence diagram according to an embodiment of the disclosure.

Turning now to FIG. 4, a message sequence 180 is described. The message sequence 180 represents an exemplary sequence of messages that may pass in the system 100 to provide a communication service to the UE 102, for example one of the communication services 108. The message sequence 180 may be considered to happen later in time than the message sequence 138 described with reference to FIG. 2 above, particularly after the processing at label 155 when the hyperledger gateway 126 adds a new block to the shared data store 134 associated with the UE 102 that includes information about the authentication credentials of the UE 102 and the communication services 108 that the UE 102 is authorized to access and use.

At label 182, the UE 102 sends a communication service request to the access node 104 identifying one of the communication services 108 and indicating that it is seeking a combined authentication and communication service authorization process. At label 184, the access node 104 parses the communication service request and determines that the UE 102 is seeking a combined authentication and communication service authorization. At label 186, the access node 104 sends a communication service request 186 to the hyperledger gateway 126 identifying the UE 102 and identifying a requested communication service 108. At label 188 the hyperledger gateway 126 looks up a record associated with the UE 102 in the shared data store 122. For example, the hyperledger gateway 126 looks at a top block of a block chain associated with the UE 102 in the shared data store 122. Unlike in the message sequence 138 described above with reference to FIG. 2 (e.g., at labels 142, 144), the hyperledger gateway 126 finds a record and/or top block associated with the UE 102.

The hyperledger gateway 126 may determine that the UE 102 is authenticated by comparing credentials sent in the service request at label 182 and in the service request at label 186 to authentication credentials of record stored in the shared data store 122. In an embodiment, the hyperledger gateway 126 decrypts an identity provided by the UE 102. The hyperledger gateway 126 authenticates the UE 102 in part by determining that the UE 102 is subscribed to receive wireless communication service. At label 188 the hyperledger gateway 126 also determines that the UE 102 is authorized to access and use the requested communication service 108. The process of performing a combined authentication and service authorization at the hyperledger gateway 126 as described above may be referred to as one-stop authentication/authorization in some contexts. In an embodiment, the authentication and authorization application 128 may perform the combined authentication and service authorization process of label 188. In an embodiment, the authentication and authorization application 128 may look up the record associated with the UE 102 in the shared data store 122 through invoking the hyperledger application 132.

At label 190, the hyperledger gateway 126 sends an authentication and authorization success to the access node 104. At label 192, the access node 104 sends a service grant to the UE 102. At label 194, the UE 102 is shown with a communication session established with one of the communication services 108. In an embodiment, rather than sending a service grant at label 192 to the UE 102, the access node 104 may simply establish the communication session at label 194 between the UE 102 and the communication service 108.

In an embodiment, the client application 116 may create a new block including all the previous information content of the top block of its transaction block chain 118 plus the information pertaining to the communication session at label 194, for example information identifying the communication service 108 and one or more of a time duration of the communication session, a data volume of the communication session, a time stamp of the start of the communication session, and/or a time stamp of the end of the communication session. The client application 116 may add this new block as the "top block" of its transaction block chain 118 and further may send this new block to the hyperledger gateway 126, for example to the hyperledger application 132, for adding to the hyperledger associated with the UE 102 that is stored in the shared data store 134.

In an embodiment, if the hyperledger gateway 126 (e.g., the authentication and service authorization application 128 executing on the hyperledger gateway 126) finds a record associated with the UE 102 in the shared data store 134 but the record does not indicate that the UE 102 is authorized to access the requested communication service 108, the hyperledger gateway 126 may check with the MME 124 to determine if the UE 102 is authorized to access the requested communication service 108. For example, if the wireless communication service subscription associated with the UE 102 had recently been modified to add the requested communication service 108, this might not be represented in the shared data store 108. If the MME 124 indicates to the hyperledger gateway 126 that the UE 102 is now authorized to access the requested communication service 108, the hyperledger gateway 132 may create a new top block for the UE 102 containing the former information content of the previous top block associated with the UE 102 and further containing the authorization for accessing the additional communication service 108. The hyperledger gateway 132 may then send the authentication and authorization success at label 190 to the access node 104. The hyperledger gateway 132 may also send the new top block to the client application 116 of the UE 102 for adding to the transaction block chain 118 of the UE 102.

Figure 5A:
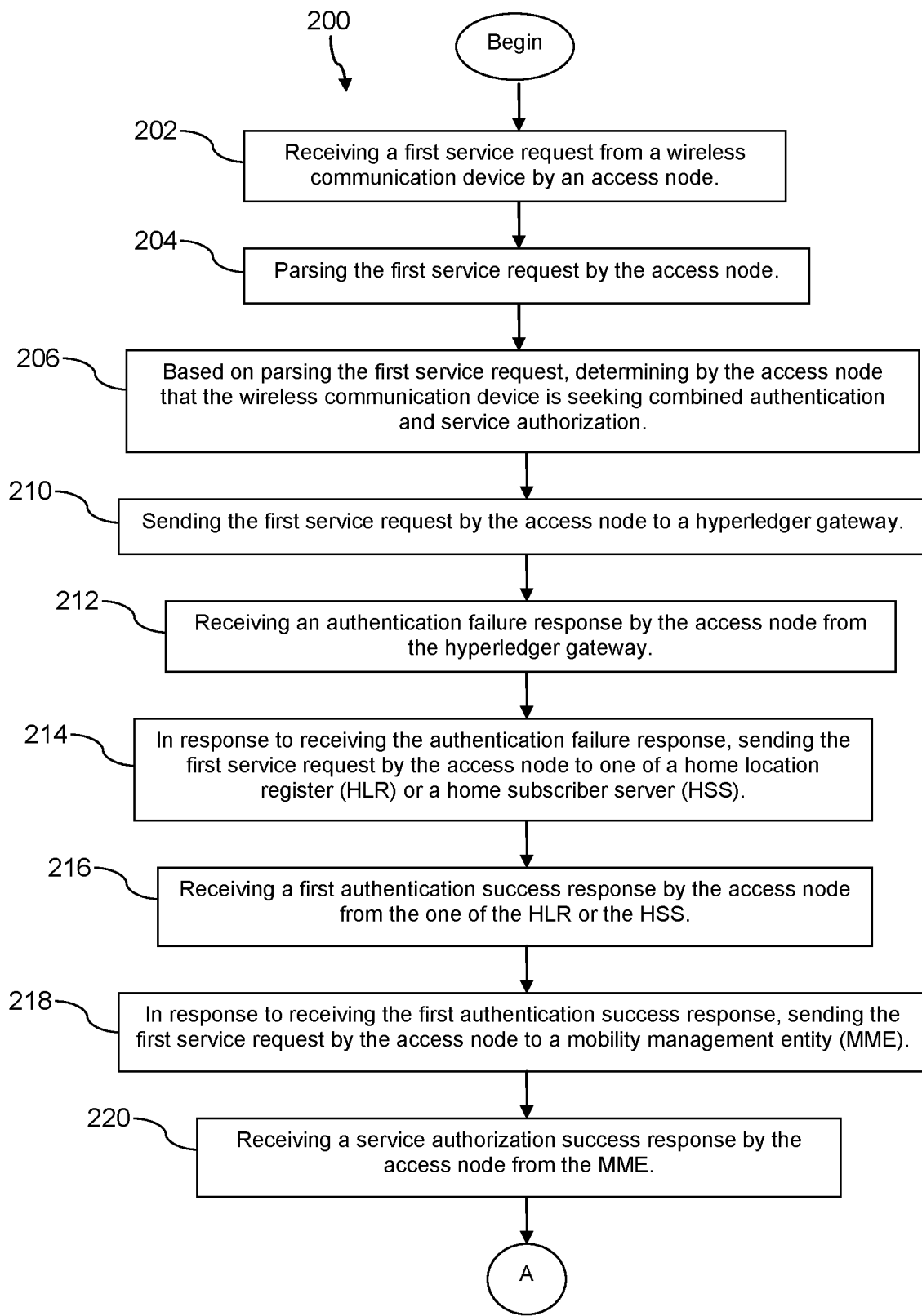
FIG. 5A and FIG. 5B are a flow chart of a method according to an embodiment of the disclosure.
Figure 5B:
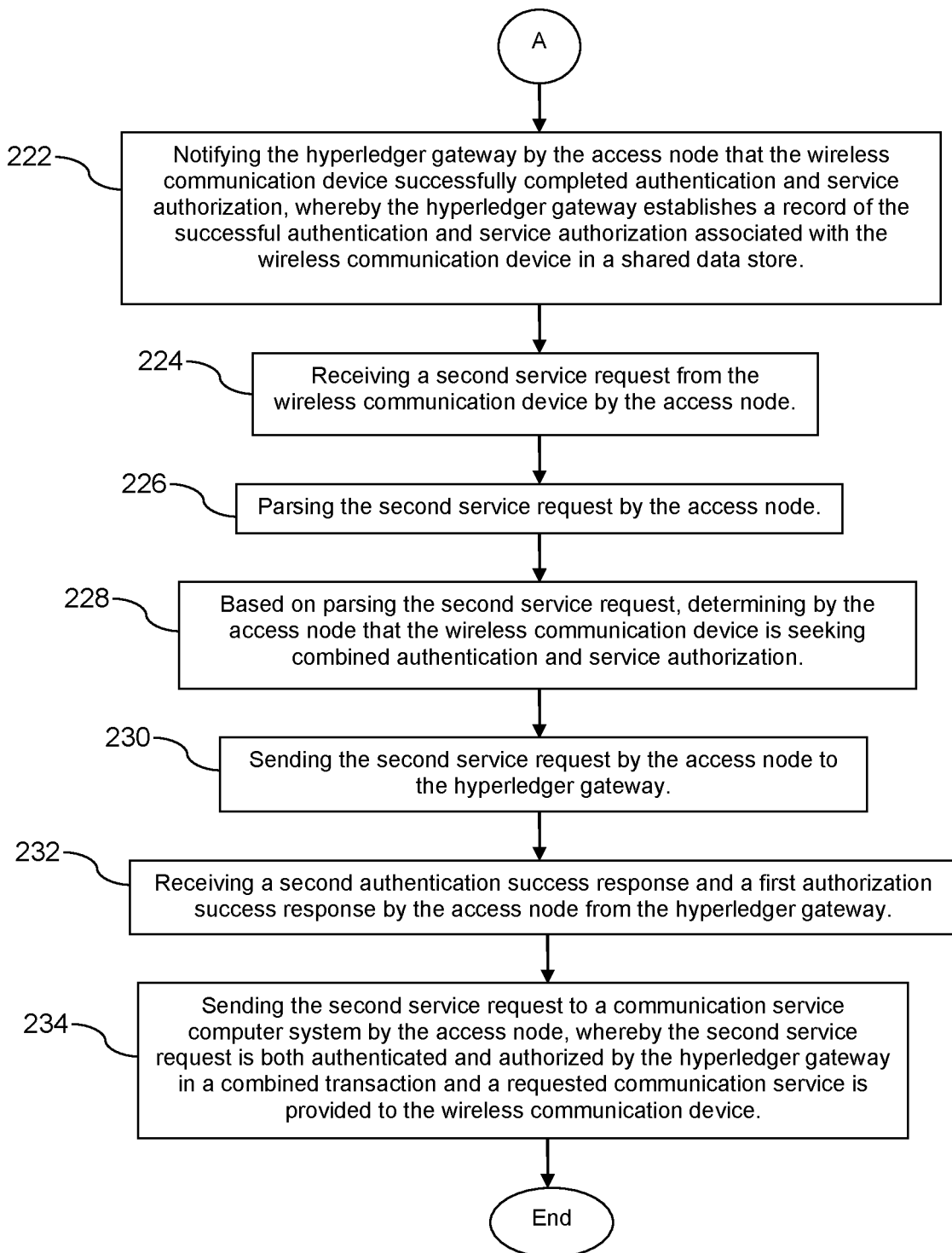

Turning now to FIG. 5A and FIG. 5B, a method 200 is described. In an embodiment, the method 200 is a method of authenticating and authorizing a wireless communication device for access to a communication service. In an embodiment, the processing of method 200 may be performed by the access node 104, for example by a controller application executing on the access node 104. At block 202, the method 200 comprises receiving a first service request from a wireless communication device by an access node. For example, the access node 104 receives the first service request from the UE 102.

At block 204, the method 200 comprises parsing the first service request by the access node. In an embodiment, parsing the first service request comprises analyzing the first service request to partition it into distinct parts. For example, the first service request may be a message that conforms to a format according to which different parts, fields, or parameters of the message are deemed to contain different information. Different fields may comprise an identity of the wireless communication device, a communication service 108 that is requested, and optionally a type of authentication and service authorization process. Parsing the first service request may entail extracting the information from the different parts, fields, and/or parameters of the message. At block 206, the method 200 comprises, based on parsing the first service request, determining by the access node that the wireless communication device is seeking combined authentication and service authorization. At block 210, the method 200 comprises sending the first service request by the access node to a hyperledger gateway. At block 212, the method 200 comprises receiving an authentication failure response by the access node from the hyperledger gateway.

At block 214, the method 200 comprises, in response to receiving the authentication failure response, sending the first service request by the access node to one of a home location register (HLR) or a home subscriber server (HSS). In an embodiment, the first service request is sent by the access node to an HLR for authentication of the wireless communication device. In another embodiment, the first service request is sent by the access node to an HSS for authentication of the wireless communication device. At block 216, the method 200 comprises receiving a first authentication success response by the access node from the one of the HLR or the HSS. At block 218, the method 200 comprises, in response to receiving the first authentication success response, sending the first service request by the access node to a mobility management entity (MME). At block 220, the method 200 comprises receiving a service authorization success response by the access node from the MME.

At block 222, the method 200 comprises notifying the hyperledger gateway by the access node that the wireless communication device successfully completed authentication and service authorization, whereby the hyperledger gateway establishes a record of the successful authentication and service authorization associated with the wireless communication device in a shared data store; At block 224, the method 200 comprises receiving a second service request from the wireless communication device by the access node. At block 226, the method 200 comprises parsing the second service request by the access node. In an embodiment, parsing the second service request comprises analyzing the second service request to partition it into distinct parts. For example, the second service request may be a message that conforms to a format according to which different parts, fields, or parameters of the message are deemed to contain different information. Different fields may comprise an identity of the wireless communication device, a communication service 108 that is requested, and optionally a type of authentication and service authorization process. Parsing the second service request may entail extracting the information from the different parts, fields, and/or parameters of the message.

At block 228, the method 200 comprises, based on parsing the second service request, determining by the access node that the wireless communication device is seeking combined authentication and service authorization. At block 230, the method 200 comprises sending the second service request by the access node to the hyperledger gateway.

At block 232, the method 200 comprises receiving a second authentication success response and a first authorization success response by the access node from the hyperledger gateway. At block 234, the method 200 comprises sending the second service request to a communication service computer system by the access node, whereby the second service request is both authenticated and authorized by the hyperledger gateway in a combined transaction and a requested communication service is provided to the wireless communication device.

Figure 6A:
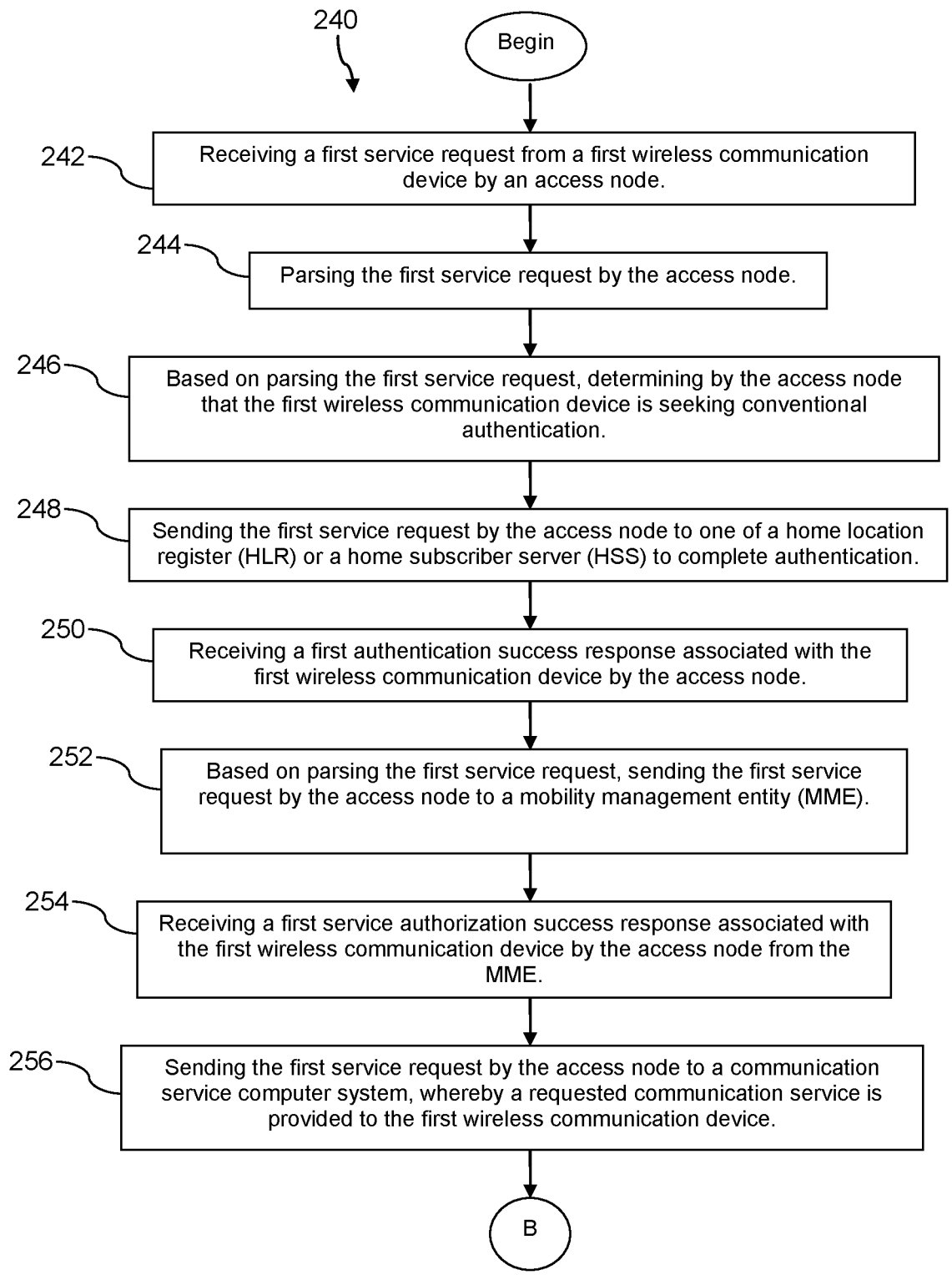
FIG. 6A and FIG. 6B are a flow chart of another method according to an embodiment of the disclosure.
Figure 6B:
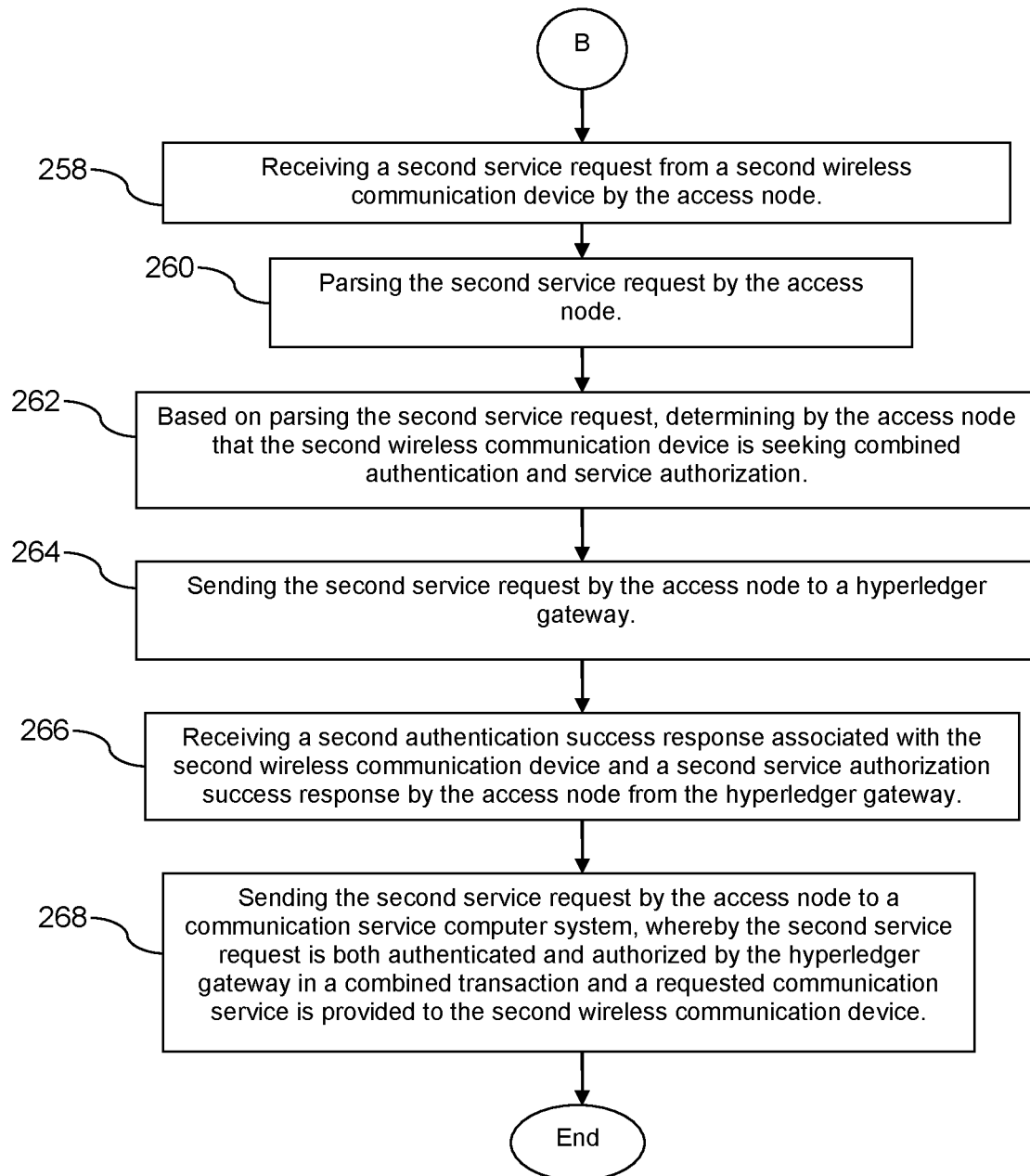

Turning now to FIG. 6A, and FIG. 6B, a method 240 is described. In an embodiment, the method 240 is a method of authenticating and authorizing a wireless communication device for access to a communication service. At block 242, the method 240 comprises receiving a first service request from a first wireless communication device by an access node.

At block 244, the method 240 comprises parsing the first service request by the access node. In an embodiment, parsing the first service request comprises analyzing the first service request to partition it into distinct parts. For example, the first service request may be a message that conforms to a format according to which different parts, fields, or parameters of the message are deemed to contain different information. Different fields may comprise an identity of the wireless communication device, a communication service 108 that is requested, and optionally a type of authentication and service authorization process. Parsing the first service request may entail extracting the information from the different parts, fields, and/or parameters of the message. At block 246, the method 240 comprises, based on parsing the first service request, determining by the access node that the first wireless communication device is seeking conventional authentication.

At block 248, the method 240 comprises sending the first service request by the access node to one of a home location register (HLR) or a home subscriber server (HSS) to complete authentication. At block 250, the method 240 comprises receiving a first authentication success response associated with the first wireless communication device by the access node.

At block 252, the method 240 comprises based on parsing the first service request, sending the first service request by the access node to a mobility management entity (MME). At block 254, the method 240 comprises receiving a first service authorization success response associated with the first wireless communication device by the access node from the MME.

At block 256, the method 240 comprises sending the first service request by the access node to a communication service computer system, whereby a requested communication service is provided to the first wireless communication device. For example, the access node 104 established a communication session between a UE 102 (e.g., the first wireless communication device) and a communication service 108. At block 258, the method 240 comprises receiving a second service request from a second wireless communication device by the access node.

At block 260, the method 240 comprises parsing the second service request by the access node. In an embodiment, parsing the second service request comprises analyzing the second service request to partition it into distinct parts. For example, the second service request may be a message that conforms to a format according to which different parts, fields, or parameters of the message are deemed to contain different information. Different fields may comprise an identity of the wireless communication device, a communication service 108 that is requested, and optionally a type of authentication and service authorization process. Parsing the second service request may entail extracting the information from the different parts, fields, and/or parameters of the message. At block 262, the method 240 comprises, based on parsing the second service request, determining by the access node that the second wireless communication device is seeking combined authentication and service authorization.

At block 264, the method 240 comprises sending the second service request by the access node to a hyperledger gateway. At block 266, the method 240 comprises receiving a second authentication success response associated with the second wireless communication device and a second service authorization success response by the access node from the hyperledger gateway. In an embodiment, the second authentication success response and the second service authorization success response may be sent by the hyperledger gateway as separate messages. Alternatively, in an embodiment, the second authentication success reponse and the second service authorization success response may be sent by the hyperledger gateway in a single message. At block 268, the method 240 comprises sending the second service request by the access node to a communication service computer system, whereby the second service request is both authenticated and authorized by the hyperledger gateway in a combined transaction and a requested communication service is provided to the second wireless communication device. For example, the access node 104 establishes a communication session between a UE 102 (e.g., the second wireless communication device) and a communication service 108.

Figure 7:
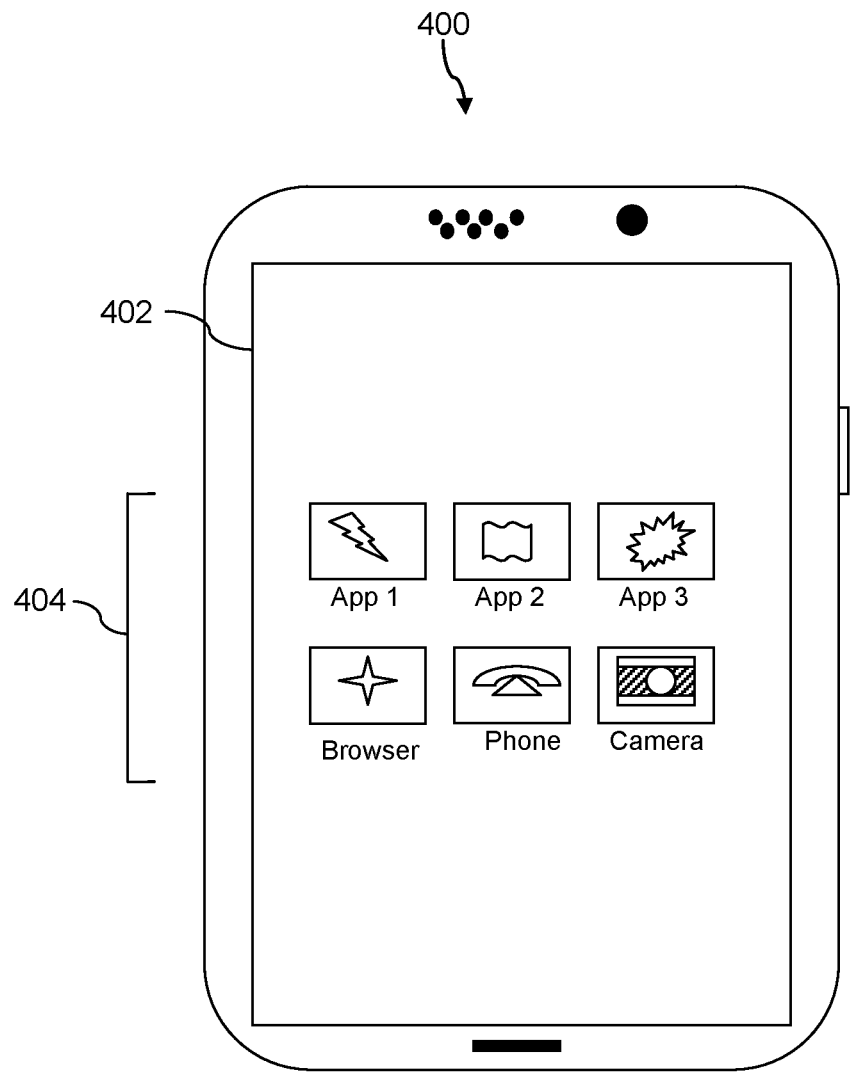
FIG. 7 is an illustration of a wireless communication device according to an embodiment of the disclosure.

FIG. 7 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 8:
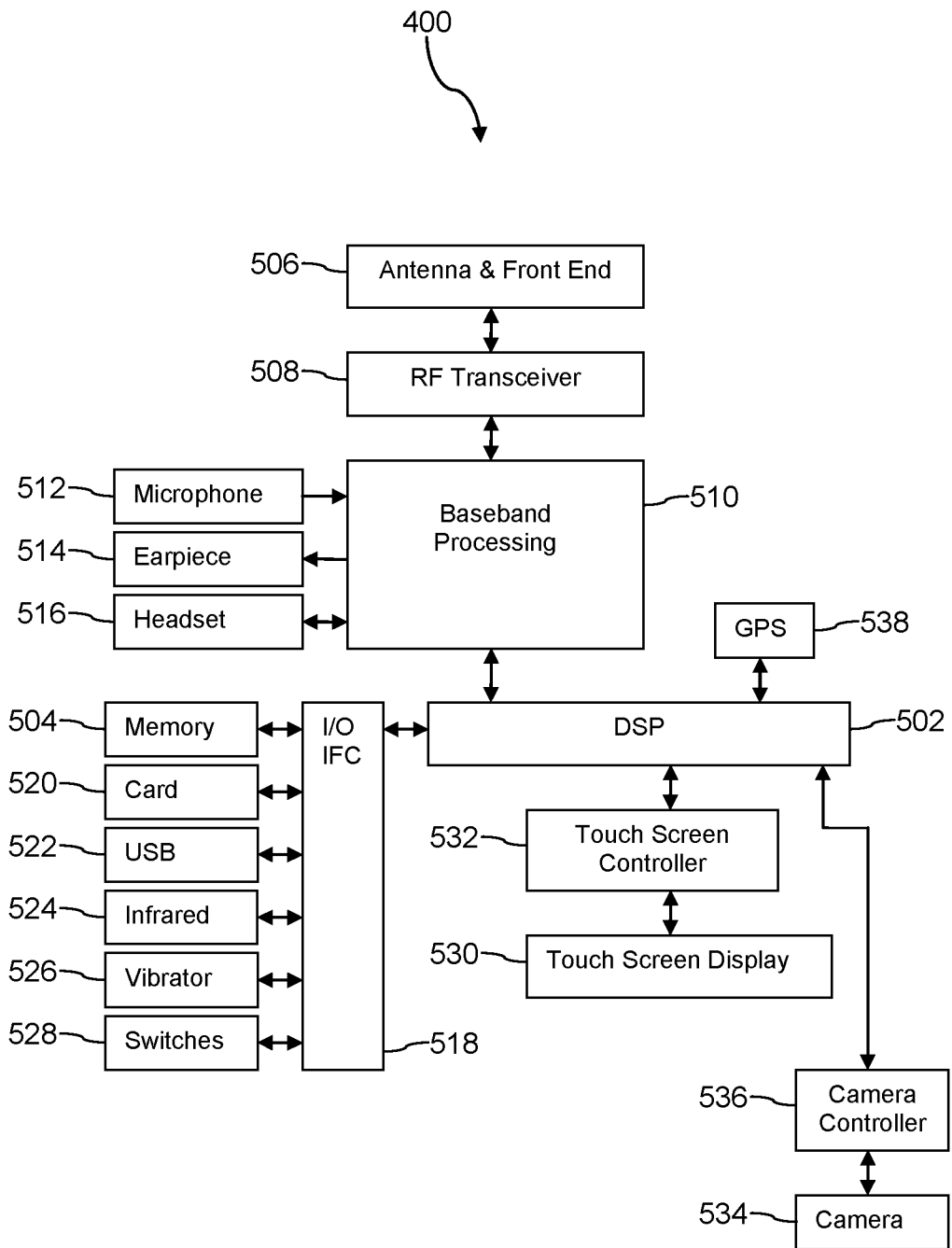
FIG. 8 is a block diagram of a hardware architecture of a wireless communication device according to an embodiment of the disclosure.

FIG. 8 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a access node according to one or more of a 5G, a long term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 9A:
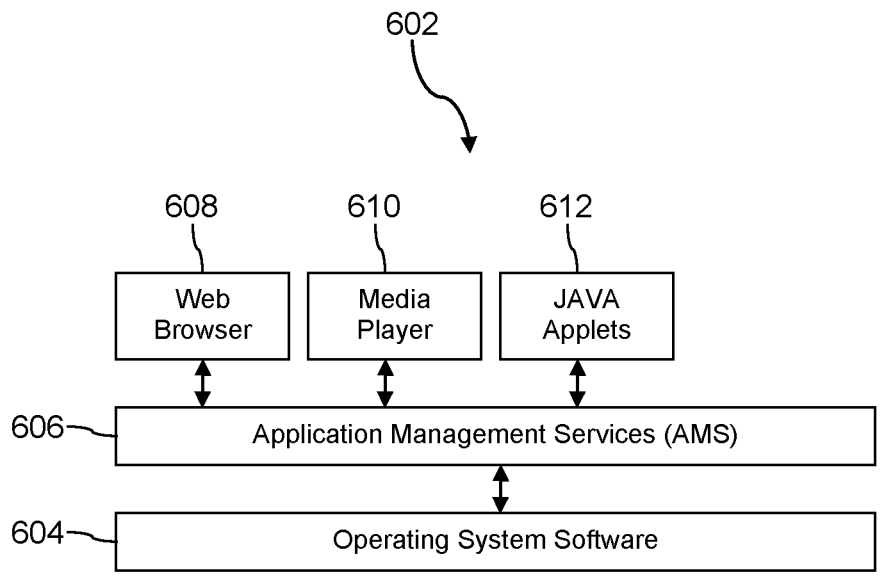
FIG. 9A is a block diagram of a software architecture of a wireless communication device according to an embodiment of the disclosure.

FIG. 9A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 9A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 9B:
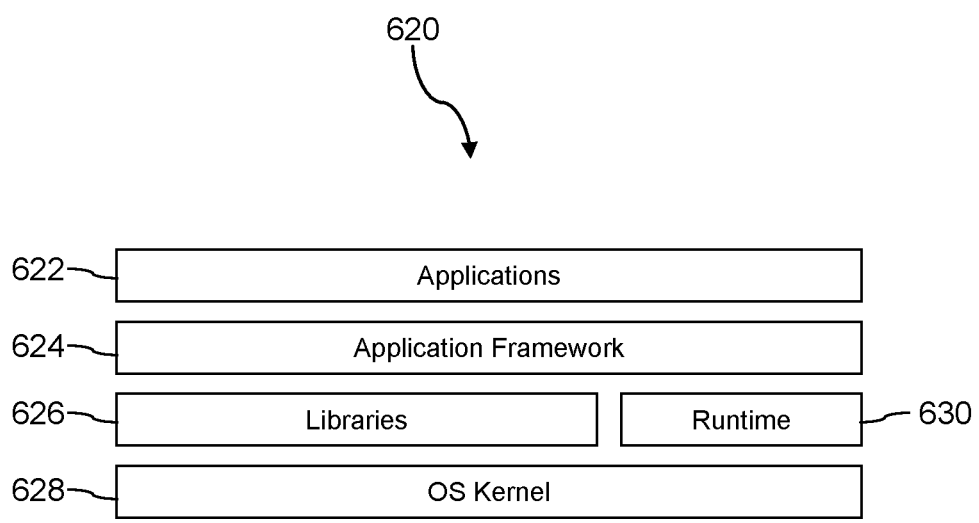
FIG. 9B is a block diagram of another software architecture of a wireless communication device according to an embodiment of the disclosure.

FIG. 9B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 10:
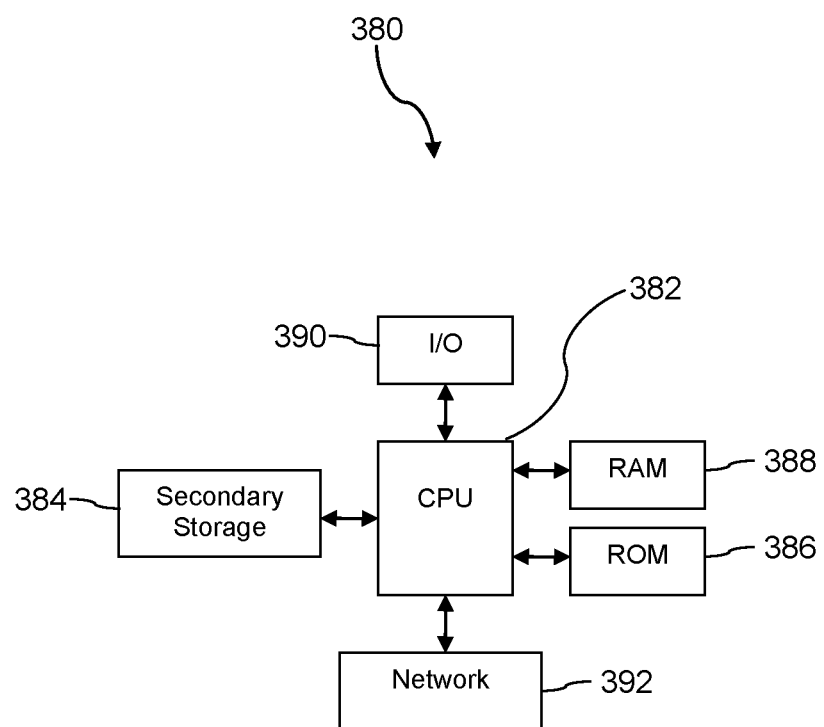
FIG. 10 is a block diagram of a computer system according to an embodiment of the disclosure.

FIG. 10 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of authenticating and authorizing a wireless communication device for access to a communication service, comprising:

receiving a first service request from a first wireless communication device by a access node;

parsing the first service request by the access node;

based on parsing the first service request, determining by the access node that the first wireless communication device is seeking conventional authentication;

sending the first service request by the access node to one of a home location register (HLR) or a home subscriber server (HSS) to complete authentication;

receiving a first authentication success response associated with the first wireless communication device by the access node;

based on parsing the first service request, sending the first service request by the access node to a mobility management entity (MME);

receiving a first service authorization success response associated with the first wireless communication device by the access node from the MME;

sending the first service request by the access node to a first communication service computer system, whereby a first requested communication service is provided to the first wireless communication device;

receiving a second service request from a second wireless communication device by the access node;

parsing the second service request by the access node;

based on parsing the second service request, determining by the access node that the second wireless communication device is seeking combined authentication and service authorization;

sending the second service request by the access node to a hyperledger gateway;

receiving a second authentication success response associated with the second wireless communication device and a second service authorization success response by the access node from the hyperledger gateway; and sending the second service request by the access node to a second communication service computer system, whereby the second service request is both authenticated and authorized by the hyperledger gateway in a combined transaction and a second requested communication service is provided to the second wireless communication device.

2. The method of claim 1, wherein the first wireless communication device or the second wireless communication device is a cell phone, a mobile phone, a smart phone, a personal digital assistant (PDA), a wearable computer, a headset computer, a laptop computer, a notebook computer, a tablet computer, or an Internet of things (IoT) device.

3. The method of claim 1, wherein the access node provides a wireless communication link to wireless communication devices according to a 5G, a long term evolution (LTE), a code division multiple access (CMDA), or a global system for mobile communication (GSM) telecommunication protocol.

4. The method of claim 1, wherein the second requested is one of a streaming video communication service, a premium content communication service, or a gaming communication service.

5. The method of claim 1, wherein the second service request comprises an encrypted identity of the second wireless communication device.

6. The method of claim 1, wherein the second service request comprises an identity of the second requested communication service.

7. The method of claim 1, wherein the hyperledger gateway maintains a blockchain comprising blocks identifying communication service authorizations of wireless communication devices.

8. The method of claim 1, wherein the second service request comprises an identity of the second wireless communication device.

9. The method of claim 7, wherein each of the blocks identifies a wireless communication device, comprises authentication credentials of the wireless communication device, and comprises one or more identities of communication services which the wireless communication device is authorized to access.

10. The method of claim 1, wherein the first communication service computer system and the second communication service computer system are the same communication service computer system.

11. The system of claim 1, wherein the first communication service computer system and the second communication service computer system are the same communication service computer system.

12. A system of authenticating and authorizing a wireless communication device for access to a communication service, the system comprising:
an access node comprising a controller application that, when executed by the access node:
receives a first service request from a first wireless communication device,
parses the first service request,
based on parsing the first service request, determines that the first wireless communication device is seeking conventional authentication,
sends the first service request to one of a home location register (HLR) or a home subscriber server (HSS) to complete authentication,
receives a first authentication success response associated with the first wireless communication device,
based on parsing the first service request, sends the first service request to a mobility management entity (MME),
receives a first service authorization success response associated with the first wireless communication device from the MME,
sends the first service request to a first communication service computer system, whereby a first requested communication service is provided to the first wireless communication device,
receives a second service request from a second wireless communication device,
parses the second service request,
based on parsing the second service request, determines that the second wireless communication device is seeking combined authentication and service authorization,
sends the second service request to a hyperledger gateway,
receives a second authentication success response associated with the second wireless communication device and a second service authorization success response from the hyperledger gateway, and
sends the second service request to a second communication service computer system, whereby the second service request is both authenticated and authorized by the hyperledger gateway in a combined transaction and a second requested communication service is provided to the second wireless communication device.

13. The system of claim 12, wherein the first wireless communication device or the second wireless communication device is a cell phone, a mobile phone, a smart phone, a personal digital assistant (PDA), a wearable computer, a headset computer, a laptop computer, a notebook computer, a tablet computer, or an Internet of things (IoT) device.

14. The system of claim 12, wherein the access node provides a wireless communication link to wireless communication devices according to a 5G, a long term evolution (LTE), a code division multiple access (CMDA), or a global system for mobile communication (GSM) telecommunication protocol.

15. The system of claim 12, wherein the second requested is one of a streaming video communication service, a premium content communication service, or a gaming communication service.

16. The system of claim 12, wherein the second service request comprises an encrypted identity of the second wireless communication device.

17. The system of claim 12, wherein the second service request comprises an identity of the second requested communication service.

18. The system of claim 12, wherein the hyperledger gateway maintains a blockchain comprising blocks identifying communication service authorizations of wireless communication devices.

19. The system of claim 12, wherein the second service request comprises an identity of the second wireless communication device.

20. The system of claim 18, wherein each of the blocks identifies a wireless communication device, comprises authentication credentials of the wireless communication device, and comprises one or more identities of communication services which the wireless communication device is authorized to access.

* * * * *